Figure 1:
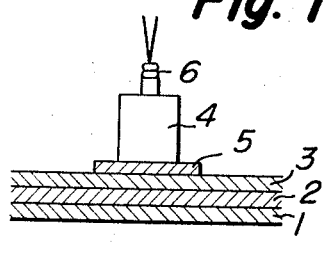

United States Patent Office 3,316,627
Patented May 2, 1967

3,316,627
SPOT WELDING METHOD FOR METALS BY EXPLOSIVES
Teruhiko Suzuki, Masayuki Kameishi, and Kazumoto Yamamoto, Nobeoka-shi, Japan, assignors to Asahi Kasei Kogyo Kabushiki Kaisha, Osaka, Japan, a corporation of Japan
Filed Nov. 5, 1963, Ser. No. 321,590
Claims priority, application Japan, Nov. 6, 1962, 37/65,759; Nov. 29, 1962, 37/52,570; Feb. 21, 1963, 38/11,027; July 12, 1963, 38/35,568; Sept. 28, 1963, 38/51,531
4 Claims. (Cl. 29—470.1)

This invention relates to a method of carrying out spot-wise pressure welding of a plurality of metal plates of the same or different materials by explosives with improvements in various shortcomings which have heretofore appeared in the customary welding methods and with the object of carrying out efficient and reliable spot welding.

In customary welding methods such as gas welding, arc welding, electric resistance welding, etc., every metal plate to be welded must be heated to such a high temperature that the metallographic structure tends to change or a layer of alloys formed, resulting frequently in serious decreases in the mechanical and chemical properties of the welded parts. Especially in the welding of anti-corrosive metal, special techniques are required to control the temperature to within one degree. It is theoretically possible to carry out a welding of thin plate less than 1 mm. thick, but in actual practice almost impossible. Almost all the customary welding machines are so large in size that they have shortcomings by reason of the fact that their applicability is restricted because of the available working space and so forth.

Recently, supersonic wave welding and friction welding have appeared as methods of lessening the thermal effect on the metal to be welded, but neither of these welding methods can be applied directly to large scale structure due to their complicated apparatus. Further, explosive pressure welding methods have been developed and have made it possible to carry out the pressure welding of metal plates, which has been heretofore considered difficult, however, the entire surfaces of metal plates must be pressure-welded in the aforementioned method, so that a large amount of explosive is required and the welding cannot be applied at any desired position due to its difficult handling and large noise of explosion. Further, it is also troublesome in the aforementioned welding method to provide a definite space between the metal plates to be pressure-welded or to use a supporter specially for that purpose.

An object of the present invention is to provide a method for the spot welding of a plurality of metal plates consisting of the same or different materials, by detonation of explosives.

Further, the present invention provides a method of carrying out a stronger pressure welding of materials, by forming a number of hollows locally on the surfaces of the base metal to be pressure-welded.

Further, the present invention provides a suitable shell for carrying out the aforementioned pressure welding method.

Further, the present invention provides a welding process of carrying out the aforementioned method at a multiplicity of positions in a very short length of time.

Figure 4:
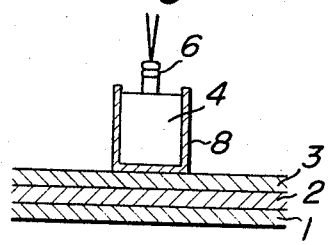
Figure 5:
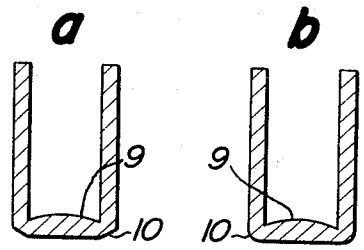
Figure 6:
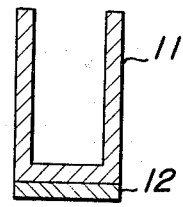
Figure 7:
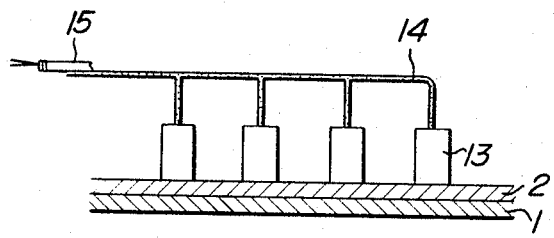
Figure 8:
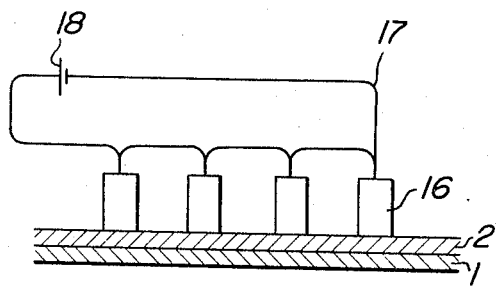

In the attached drawing:
FIGS. 1, 3 and 4 are side views showing in schematic form the explosive spot welding method of the present invention, FIG. 2 is a side view showing the material after the explosive spot welding has been carried out, FIGS. 5, 6(a) and (b) are side views showing the construction of an explosive cartridge to be employed in carrying out the explosive spot welding method of the present invention and FIGS. 7 and 8 are side views showing a method of carrying out the explosive spot welding method of the present invention at a multiplicity of positions.

Referring to the drawings, FIG. 1 represents a side view showing a principle of the present invention wherein metal plates 1, 2 and 3 to be pressure-welded are put one upon another and the explosive 4 is placed via a medium or buffer member 5 on a free surface of metal plate 3, and metal plates 1, 2 and 3 are locally pressure-welded to one another by detonating explosive 4 by use of a detonator 6.

Figure 2:
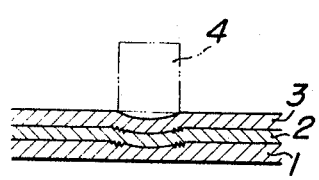
Figure 3:
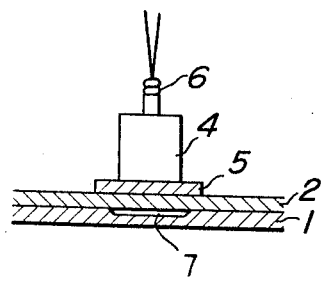

A section through the pressure-welded metals is shown in FIG. 2 and the pressure traces are brought about on metal plates 1, 2 and 3 at the positions opposite to that of the explosive 4 while the pressure welding is brought about by forming small wrinkles at the positions in the mutual contact surface of metal plates opposite to the circumference of the explosive cartridge bottom. Accordingly, the pressure-welded parts form ring-wise shapes in a plan view.

In carrying out the spot welding of the present invention, if the surfaces corresponding to the parts of metal plates to be pressure-welded are dirty with a layer of oxides, anti-corrosive film, dust, oil, water, or other contaminants, it is necessary to carry out a chemical treatment employing acid, alkali, or volatile solvents, etc., or a mechanical treatment employing sand paper, grinder, grit blast, etc. Otherwise, it is impossible to carry out the pressure-welding or to obtain a sufficient strength of pressure-welding. Naturally, such a treatment is not necessary if the metal surface is clean. It is possible, with metal plates placed one upon another, to apply the spot welding of the present invention to metal plates (hereafter referred to as "layer metal") of 4 mm. in combined thickness other than the metal plate at the other side where the explosive is not disposed (hereafter referred to as "base metal").

However, when a 2 mm. thick metal plate is used as one or a plurality of layer metals put one upon another, or such metal plates relatively poor in ductility such as titanium, stainless steel, etc. of over 1.5 mm. in thickness are used, the pressure-welding strength may become somewhat weak, if no voids are provided between the plates respectively put one upon another before the pressure welding is carried out. Thus, as indicated in FIG. 3, after a hollow 7 of equal or double area to that of the explosive cartridge bottom has been formed in advance on the part of base metal 1 to be pressure-welded by mechanical or chemical means, layer metals are put together one upon another and the explosive 4 is disposed via a medium 5 right over the hollow; a detonation with use of a detonator 6 brings about a good pressure welding. The depth of a hollow is not of severe restriction, and it ranges between 0.1 and 1 mm. and is gradually increased depending on the plate thickness or ductility.

Further, the area of the hollow is, as aforementioned, in a range equal or double of that of the explosive cartridge bottom, and no remarkable effect is to be obtained beyond the range.

Further, a grinder or grit blast is suitable to make a hollow as a mechanical means, and an etching agent of rapid effect as a chemical means, the former being preferred.

The medium or buffer member of the present invention serves to prevent hot gas of high pressure generated by detonation from direct collision with a metal surface which thereby avoids scarring of the metal plate and undesirable thermal influence. Said medium consists of fibrous material such as paper, fabric, wood etc. or high polymer materials such as rubber, synthetic resin etc. If these media are of metal or mineral materials they can prevent an influence of hot gas, but its use is not practical because the metal surface is impaired by their fragments.

Further, in carrying out the spot welding method of the present invention, as indicated in FIG. 4, with use of the explosive cartridge or cartridge wherein the explosive is charged in the shell 8 consisting of the fibrous material or high polymer material, the bottom plate of the shell 8 serves as the aforementioned medium and its handling becomes convenient.

FIGS. 5(a) and (b) illustrate the construction of the shell for carrying out more effectively the spot welding of the present invention and showing how the detonation pressure of the explosive can be concentrated on the metal surfaces to be pressure-welded by making the inner surface of the bottom plate of the shell a raised curved bottom 9 so as to form part of a spherical surface.

Further, a contour of the pressure trace formed on the metal surface after the spot welding can be made indistinct as well as the hardening around the pressure trace can be controlled by making the circumference around the bottom plate of the shell in a cut-off shape 10 with no provision of any corners. Further, as indicated in FIG. 6, if some adhesive of anti-metallic property or a piece of tape both surfaces of which are coated with an anti-metallic adhesive, is provided on the bottom surface of the shell 11, the disposition of the explosive cartridge becomes easy and the working efficiency is enhanced in the application of the spot welding to ceilings and wall surfaces.

It is possible to apply the spot welding of the present invention to a multiplicity of positions in a very short length of time. FIG. 7, for instance, shows an example wherein the base metal 1 and layer metal 2, both having wide surfaces, are subjected to the spot welding at a multiplicity of positions, the explosive cartridges 13 being connected with the explosives in a cord form, which can propagate the detonation at a high speed, or a detonating fuse 14 which is conventionally known is disposed at the desired positions on the layer metal 2 put upon the base metal 1, whereas the detonation is initiated from the one end by the detonator 15 and the pressure welding of the aforementioned base metal 1 and layer metal 2 can be brought about at a multiplicity of positions by successive detonations of each explosive cartridge in a very short length of time. Further, FIG. 8 shows a method of carrying out the pressure welding electrically at a multiplicity of positions, wherein the explosive cartridges 16 having an integrated construction of the explosive with the electric igniter, which has heretofore been known are disposed on the surface of the layer metal 2 put upon the base metal 1 at the desired positions and are connected in series with each leg wire 17 for electric ignition, and the detonation of each explosive cartridge 16 in a very short length of time brings about the pressure welding by passing electricity by use of battery or exploder 18. The explosives to be employed in the spot welding of the present invention is the secondary explosives such as hexogen, PETN, tetryl, TNT etc. or the priming composition such as fulminate of mercury, DDNP etc., and the kind and quantity of the explosives are determined according to the circumstances employed, especially depending on the thickness and quality of the metal plates to be pressure-welded.

*Example 1*

Two layer metals of 0.5 mm. thick stainless steel plates (JIS SUS-27) of 50 by 50 mm. area were put, upon the base metal of 9 mm. thick mild steel plate (JIS SS-41) of 50 by 50 mm. area and 1.5 g. of PETN, compressed-formed into a cylinder 10 mm. in diameter and 10.5 mm. high was disposed on the stainless steel plate via a 1 mm. thick, 20 mm. diam. polyvinyl chloride plate as the medium. Detonation with use of No. 6 electric detonator brought about complete pressure welding of the aforementioned three metal plates with one another. Complete pressure welding of the aforementioned three metal plates has been achieved through detonation employing No. 6 electric detonator.

*Example 2*

A layer metal of 1 mm. thick brass plate (JIS BsPlS) of 50 by 50 mm. area was put upon the base metal of 9 mm. thick mild steel plate (JIS SS-41) of 50 by 50 mm. area and the same explosive as that in Example 1 was disposed on the brass plate via a 1 mm. thick, 20 mm. diam. rubber plate as the medium. Complete pressure welding of the aforementioned two metal plates was effected through detonation by employing 0.3 g. of DDNP as a detonator.

*Example 3*

A layer metal of 2 mm. thick aluminum plate (JIS A1P1) of 50 by 50 mm. area was put upon the base metal of 9 mm. thick mild steel plate (JIS SS-41) of 50 by 50 mm. area and 2.1 g. of granular explosive composition consisting of 65% of DDNP and 35% of $KClO_3$, compressed-formed into a 15 mm. high, 9 mm. diam. cylinder, was disposed on the aluminum plate via a piece of wood, 1 mm. thick and 15 mm. in diameter as the medium. Complete pressure welding of the aforementioned two plates was effected through ignition detonation and such strength of pressure welding was obtained as a breakage took place at non-pressure-welded part of the aluminum plate in a shearing test of the pressure-welded part.

*Example 4*

A layer metal of 1 mm. thick titanium plate (JIS ST-60) of 50 by 50 mm. area was put upon the base metal of 9 mm. thick mild steel plate (JIS SS-41) of 50 by 50 mm. area. An explosive cartridge was provided wherein 1.2 g. of PETN was charged under 150 kg./cm.$^2$ into a shell, 10 mm. in inside diameter, 2 mm. in side wall thickness, 1.5 mm. in bottom plate thickness and 50 mm. high, of polystyrene resins with a bottom. Complete pressure welding of the aforementioned metal plates was effected through detonation employing 0.3 g. of DDNP as a detonator.

*Example 5*

A 5 mm. thick mild steel plate (JIS SS-41) of 50 by 50 mm. area was used as the base metal and a 3 mm. thick titanium plate of the same area as that of the base metal was used as the layer metal. An almost circular hollow, approximately 12 mm. in diameter and 0.4 to 0.5 mm. deep was made at the center of the base metal with use of a grinder (#100) and was put together with the aforementioned layer metal. 3.5 g. of columned PETN, 9 mm. in diameter, which was compressed-form under 250 kg./cm.$^2$, was disposed on the layer metal. Complete pressure welding of the aforementioned two metal plates was effected through detonation by employing 0.3 g. of DDNP. In the strength test of the pressure-welded part of the sample, the exfoliating and shearing weights were 511 kg. and 2,400 kg. respectively. In this connection, more than ten runs of pressure welding were carried out with a combination of layer metal with base metal of the same dimensions as those in the above except no formation of a hollow on the base metal, but the pressure welding failed in every run.

*Example 6*

The shell was such a cylinder pipe with a bottom, 10 mm. in inside diameter, 2 mm. thick and 50 mm. high, made of hard polyvinyl chloride resins where the bottom inner surface was made a raised curved bottom forming part of a spherical surface of 24 mm. radius as indicated in FIG. 5(a), and the circumference of the outside bottom was cutoff at 30° angle to the bottom surface and at 5 mm. distant from the axis of the cylinder pipe. A layer metal of 1 mm. thick stainless steel plate (JIS SUS–27) of 50 by 50 area, put upon the base metal of 9 mm. thick mild steel plate (JIS SS–41) of the same area as that of the layer metal was employed as the materials for the pressure welding.

The shell, wherein 1.2 g. of PETN was charged under 250 kg./cm.$^2$ and further 0.3 g. of DDNP as a detonator was added with no compression, was disposed at the center of stainless steel plate. Complete pressure welding of the aforementioned two metal plates was effected through detonation, where the maximum depth of the pressure trace was 0.62 mm., but the contour of the pressure trace was indistinct (stample number 1), whereas the shell which was of such construction with no cutting-off around the bottom circumference of the aforementioned cylinder pipe was subjected to the pressure welding in the same manner as that of the aforesaid, resulting in complete pressure welding of the metal plate, but the maximum depth of the pressure trace was 0.60 mm. and the contour of the pressure welding was very distinct (sample number 2).

Hardness of the pressure trace on the stainless steel plate surface was determined for the samples 1 and 2 respectively. The results obtained are as follows:

| Position from the center of pressure trace, (mm.) | Sample Number (Hv) | | Remarks |
| --- | --- | --- | --- |
| | 1 | 2 | |
| 3.0 | 235 | 235 | |
| 4.0 | 237 | 234 | |
| 5.0 | 240 | 244 | |
| 6.0 | 251 | 275 | |
| 6.5 | 258 | 320 | Corresponding to contour of pressure trace. |
| 7.0 | 261 | 377 | |
| 7.5 | 264 | 359 | |
| 8.0 | 243 | 298 | |
| 9.0 | 237 | 251 | |

*Example 7*

The shells consisted of such cylinder pipes with a bottom, 10 mm. in inside diameter, 2 mm. thick and 50 mm. high, made of polystyrene resins where the bottom inner surface was provided with a raised, curved bottom forming part of a spherical surface of 24 mm. radius as indicated in FIG. 5(b), and further such shells either being processed by cutting off the corner of the bottom circumference of the cylinder pipes to provide 2 mm. radius (shell identification A) or not processed (shell identification B). The pressure welding was made to the respective shell according to the same manner and conditions as those in Example 6, resulting in complete pressure welding in every case. The maximum hardness of contour part of the pressure trace on the stainless steel plate was 278 Hv for the explosive cartridge A and 383 Hv for the explosive cartridge B.

*Example 8*

A base metal of 12 mm. thick mild steel plate (JIS SS–41) of 1,000 by 100 mm. area put together with a layer metal of 1 mm. thick titanium plate (JIS ST–50) of the same area as that of the base metal was employed as the materials for pressure welding. Such explosive cartridge was employed wherein 1.2 g. of PETN was charged under 250 kg./cm.$^2$ in the shell equivalent to the one (A) as described in Example 7. 15 explosive cartridges were disposed on the center line of the layer metal surface in the longitudinal direction at a 50 mm. distance and the explosive in a cord form of 3 by 4 mm. cross-section, consisting of 70% of PETN, 15% of paraffin was and 15% of petrolatum, was inserted into the respective cartridge and connected to one another. Complete pressure welding at the positions where the explosive cartridges were disposed on the aforementioned metal plate was effected through detonation employing electric detonator No. 6 at one end. Average shearing weight of the respective pressure-welded part was 1,900 kg.

*Example 9*

A base metal of 12 mm. thick mild steel plate (JIS SS–41) of 300 by 500 mm. area put together with a layer metal of 1 mm. thick titanium plate (JIS ST–60) of the same area as that of the base metal was employed as the materials for pressure welding. The explosive cartridges were such that 1.2 g. of PETN was charged under 250 kg./cm.$^2$ into the shell equivalent to the one (A) as described in Example 7, further 0.3 g. of DDNP was charged with no compresion, and the electric igniter was provided. 15 explosive cartridges were disposed on the layer metal surface in three rows including 5 cartridges respectively so that the distances between the adjacent rows as well as between the adjacent cartridges in a row might be 100 mm. respectively. The leg wires for electric ignition provided for every cartridge were connected in series and ignition was carried out by D.C. 100 volt power source. Complete pressure welding at 15 positions on the aforementioned metal plate was effected through detonation. Average shearing weight of each pressure-welded part was 1,780 kg.

As explained in the foregoing, the spot welding of the present invention is extremely useful in many aspects. According to the present invention, it is possible to apply pressure welding to thin plates employing a small amount of explosives and without causing any change in the quality of the plate which has heretofore been difficult or impossible in the conventional welding methods. Furthermore, the method according to the invention can be effected without employing any special equipments or supporter, and pressure welding can be carried out simply by putting the plates one upon another and placing the explosives with no requirement of special technique. It is to be noted that the method can be applied to pure metals such as steel, iron, copper, tin, aluminum, nickel, chromium, cobalt, titanium, niobium, magnesium, tungsten, zirconium, beryllium, molybdenum, tantalum vannadium, silver, gold, platinum etc. or other alloys.

Further, the spot welding of the present invention enables its application to ceilings, wall surfaces, or in narrow spaces, and the mechanical strength of the pressure-welded parts is at least twice that obtained by the conventional electric resistance spot welding, and further even if processing such as bending is carried out on the materials after the pressure welding has been applied, no troubles appear at the pressure-welded parts at all. The present invention therefore has many advantages in the wide use of materials and has wide industrial application such as the lining of chemical apparatus in architecture, vessels and vehicles etc.

What we claim is:

1. A method of spot welding metal plates by explosion comprising superimposing on one another a plurality of metal plates of the same or different materials to be spot welded, forming a container for an explosive from buffer material selected from the group consisting of a fibrous material, rubber, and a synthetic high polymer resin, said container being formed so that the surface of the buffer material which contacts the explosive has a convex surface to concentrate the force of the detonation of the explosive in a localized area, placing said container with the explosive therein, on the outer surface of an outer plate in at least one discrete relatively small area of said plate, and detonating the explosive to produce spot pressure-welding at the mutual contact surfaces of the metal plates at said at least one discrete area.

2. A method of spot welding according to claim 1 which comprises previously forming a hollow 0.1 to 1 mm. deep and of an area equal to or up to twice as great as the bottom area of the explosive in the contact surface of the metal plate furthest from the explosive, said explosive being positioned on the outer plate in a region in alignment with said hollow.

3. A method of spot welding according to claim 1 in which said container for the explosive is formed as a cylindrical tube which has a bottom having an inner surface with said convex surface and the peripheral surface of the bottom immediately below the wall of the tube is rounded off.

4. A method of spot welding according to claim 3 in which the tube is formed with a layer of adhesive material on its outer bottom surface.

References Cited by the Examiner

UNITED STATES PATENTS

| | | | |
|---|---|---|---|
| 1,355,224 | 10/1920 | Gravell | 29—498.5 |
| 2,367,206 | 1/1945 | Davis | 29—421 |
| 2,615,591 | 10/1952 | Special | 29—421 |
| 3,024,526 | 3/1962 | Philipchuk et al. | 29—421 |
| 3,140,539 | 7/1964 | Holtzman | 29—421 |
| 3,197,856 | 3/1965 | Polhemus et al. | 29—421 |
| 3,212,183 | 10/1965 | Burman et al. | 29—421 |

FOREIGN PATENTS 766,741  1/1957  Great Britain.

JOHN F. CAMPBELL, *Primary Examiner.*

P. M. COHEN, *Assistant Examiner.*